United States Patent
Li et al.

(10) Patent No.: US 12,449,916 B2
(45) Date of Patent: Oct. 21, 2025

(54) CONTROL METHOD, STYLUS, APPARATUS, ELECTRONIC DEVICE, AND STORAGE MEDIUM

(71) Applicant: BEIJING XIAOMI MOBILE SOFTWARE CO., LTD., Beijing (CN)

(72) Inventors: Linnan Li, Beijing (CN); Yong Zhang, Beijing (CN); Xinyu Chen, Beijing (CN); Lu Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/412,423

(22) Filed: Jan. 12, 2024

(65) Prior Publication Data
US 2025/0044882 A1 Feb. 6, 2025

(30) Foreign Application Priority Data
Jul. 31, 2023 (CN) .......................... 202310952488.7

(51) Int. Cl.
*G06F 3/0354* (2013.01)
*G06F 3/041* (2006.01)
*G06F 3/0481* (2022.01)
*G06F 3/04883* (2022.01)

(52) U.S. Cl.
CPC ...... *G06F 3/03545* (2013.01); *G06F 3/04162* (2019.05); *G06F 3/0481* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2009/0044136 A1* | 2/2009 | Flider | G06T 7/194 715/764 |
| 2014/0354553 A1* | 12/2014 | Dai | G06F 3/044 345/173 |
| 2016/0266642 A1* | 9/2016 | VanBlon | G06F 3/04883 |
| 2020/0249773 A1 | 8/2020 | Lee | |

FOREIGN PATENT DOCUMENTS

| CN | 106909235 A * | 6/2017 |
|---|---|---|
| EP | 4206885 A1 | 7/2023 |

OTHER PUBLICATIONS

Extended Europen Search Report issued in Application No. 24153619.2 dated Aug. 1, 2024, (10p).

* cited by examiner

*Primary Examiner* — Duane N Taylor, Jr.
(74) *Attorney, Agent, or Firm* — Arch & Lake LLP

(57) ABSTRACT

The present disclosure relates to a control method, a stylus, an apparatus, an electronic device, and a storage medium. The control method includes: receiving a key press event sent by a stylus; determining a press type according to the key press event; determining a control operation corresponding to the press type; and performing the control operation; where a different press type corresponds to a different control operation. The control method can realize the remote control operation of the electronic device by means of a key on the stylus, and can realize a diversity of control operations by means of the press type of the key, and furthermore, the control operation is not restricted by an operating system and a projection manner, which can enhance the usage experience of the user.

14 Claims, 9 Drawing Sheets

CONTROL METHOD, STYLUS, APPARATUS, ELECTRONIC DEVICE, AND STORAGE MEDIUM

CROSS-REFERENCE TO RELATED APPLICATION

The present application claims the benefit of priority to Chinese Patent Application No. 2023109524887, filed on Jul. 31, 2023, the entire contents of which are incorporated herein by reference for all purposes.

BACKGROUND

Common peripheral input devices for electronic devices include laser pointers and styluses. The laser pointer is capable of pointing anywhere on a projection screen to achieve the function of assisting in a presentation, and the stylus is capable of making inputs in the electronic device through a handwriting mode. The laser pointer has two main forms, i.e., a physical laser and a digital laser, the physical laser is to emit real light and irradiate it to the curtain of the projector, and the digital laser is to simulate the laser by displaying light spots on the display screen. The handwriting mode of the stylus mainly achieves the input operation through the screen touch control.

SUMMARY

The present disclosure relates to the field of computer technology, and in particular, to a control method, a stylus, an apparatus, an electronic device and a storage medium. The present disclosure provides a control method, a stylus, an apparatus, an electronic device, and a storage medium.

According to a first aspect of the embodiments of the present disclosure, a control method is provided, the method including:
 receiving a key press event sent by a stylus;
 determining a press type according to the key press event;
 determining a control operation corresponding to the press type;
 performing the control operation;
 where different press types correspond to different control operations.

According to a second aspect of the embodiments of the present disclosure, there is provided a stylus including a pen body, where the stylus includes: a first physical key provided in the pen body, a processing module and a wireless transmission module;
 the first physical key is configured to: receive a press input operation;
 the processing module is configured to: generate a key press event according to the press input operation;
 the wireless transmission module is configured to: send the key press event.

According to a third aspect of the embodiments of the present disclosure, there is provided a control method for using a stylus, including:
 receiving a press input operation against the first physical key;
 generating a key press event according to the press input operation;
 sending the key press event.

According to a fifth aspect of the embodiments of the present disclosure, there is provided an electronic device, including:
 a processor;
 a memory for storing instructions executable by the processor;
 where the processor is configured to perform the method as described in the first aspect of the embodiments of the present disclosure, or, to perform the method as described in the third aspect of the embodiments of the present disclosure.

According to a sixth aspect of the embodiments of the present disclosure, there is provided a non-transitory computer-readable storage medium that, when instructions in the storage medium are executed by a processor of an electronic device, the electronic device is enabled to perform the method as described in the first aspect of the embodiments of the present disclosure, or, perform the method as described in the third aspect of the embodiments of the present disclosure.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to the exemplary embodiments, examples of which are illustrated in the accompanying drawings. The following description refers to the accompanying drawings in which the same numbers in different drawings represent the same or similar elements unless otherwise represented. The implementations set forth in the following description of the exemplary embodiments do not represent all implementations consistent with the present disclosure. Instead, they are merely examples of apparatuses and methods consistent with some aspects of the present disclosure as recited in the appended claims.

A type of laser pointer uses a physical laser, the disadvantage of which includes: the need to use a projector. The physical laser light of the laser pointer is absorbed by the display screen, and the physical laser light cannot be displayed well on the display screen. Therefore, the laser pointer needs to be connected to the projector and operated on the projected screen of the projector.

Another type of laser pointer uses a digital laser, the disadvantage of which includes: requiring additionally installed software to display light points and only supporting use on the operating systems such as Windows/MAC.

When using a stylus that only supports the handwriting function, it is impossible to realize the remote control operation of the electronic device during projection.

Therefore, when the electronic device uses other operating systems (e.g., Android operating system) than the operating system (e.g., Windows/MAC) and the projection is performed to a relatively large screen, the above-described laser pointer using the physical laser, the above-described laser pointer using the digital laser, and the above-described stylus that only supports the handwriting function are unable to perform the function of visual indication.

In some embodiments of the present disclosure, a new physical key is provided on the stylus.

Figure 1:
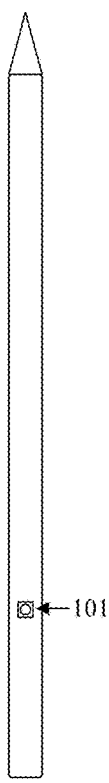
FIG. 1 is a schematic diagram of a stylus according to some embodiments of the present disclosure.

In an implementation, as shown in FIG. 1, a physical key 101 is included on a pen body of the stylus for receiving a press input operation, so as to achieve a remote control operation of the electronic device, and the physical key 101 may be named a focus key, an intelligent key, a remote key, a remote control key, a remote controlling key, and the like.

The physical key 101 in FIG. 1 is provided in a position on the pen body near the cap end. The position of the first physical key 101 on the pen body is not limited to the situation shown in FIG. 1. In addition to the position near the cap end shown in FIG. 1, the first physical key 101 may also be provided in a position on the pen body near the nib end, and may be provided in a position in the middle of the pen body, and may be provided in other possible positions on the pen body.

Figure 2:
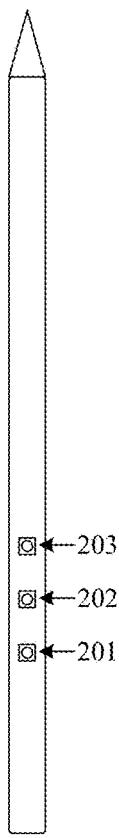
FIG. 2 is a schematic diagram of a stylus according to some embodiments of the present disclosure.

In an implementation, as shown in FIG. 2, the pen body of the stylus includes three physical keys, and the three physical keys include: a first physical key 201, a second physical key 202, and a third physical key 203. The first physical key 201 is used to receive a press input operation to achieve a remote control operation of the electronic device, the second physical key 202 is used for a screenshot function, the third physical key 203 is used for a shorthand function, or, the second physical key 202 is used for the shorthand function and the third physical key 203 is used for the screenshot function.

The three physical keys in FIG. 2 are provided in a position on the pen body near the cap end. The position of the three physical keys on the pen body is not limited to the situation shown in FIG. 2. In addition to the position near the cap end shown in FIG. 2, the three physical keys may also be provided in a position on the pen body near the nib end, may also be provided in a position in the middle of the pen body, and may also be provided in other possible positions on the pen body. The three physical keys may also be respectively provided at a position near the nib end, a position in the middle, and a position near the cap end on the pen body. In short, the three physical keys may be provided at various possible positions on the pen body. When the stylus has a plurality of sides, a part of the three physical keys and another part of the physical keys may be provided on different sides of the stylus. For example, the three physical keys are provided on three different sides of the stylus.

In some possible implementation, the pen body of the stylus includes two physical keys. The two physical keys includes: the first physical key 201 and the second physical key 202, or, the two physical keys includes: the first physical key 201 and the third physical key 203. The two physical keys may be provided on the pen body in a position close to the cap end, may be provided in a position in the middle of the pen body, and may also be provided in other possible positions on the pen body. The two physical keys may also be respectively provided at two positions among the following positions on the pen body: the position near the nib end, the middle position and the position near the cap end. In short, the two physical keys may be set at various possible positions on the pen body. When the stylus has a plurality of sides, one of the two physical keys and the other physical key may be respectively provided on different sides of the stylus. For example, the two physical keys are provided on two different sides of the stylus.

In some possible implementations, a processing module 204 and a wireless transmission module 205 are also provided within the pen body of the stylus. The first physical key 201 is used to receive a press input operation; the processing module 204 is used to generate a key press event according to the press input operation; and the wireless transmission module 205 is used to send the key press event. The processing module 204 may be a central processing module, for example: the processing module 204 is a central processing chip; the wireless transmission module 205 may be a short-range wireless communication module, for example: the wireless transmission module 205 may be a high-fidelity wireless communication (Wireless Fidelity, Wi-Fi) module, a Bluetooth module, an infrared module, a Near Field Communication (NFC) module, a ZigBee module, and other near field communication modules.

Figure 3:
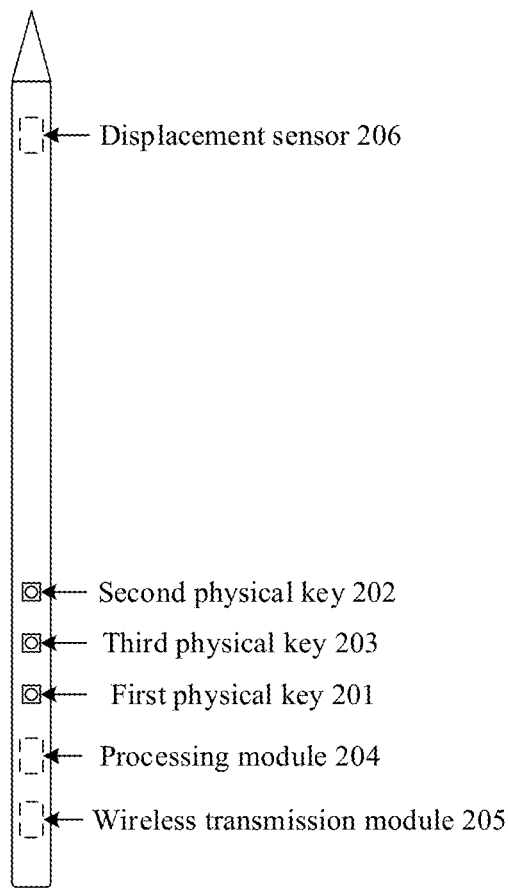
FIG. 3 is a schematic diagram of a stylus according to some embodiments of the present disclosure.

In some possible implementations, as shown in FIG. 3, a displacement sensor 206 is also provided within the pen body of the stylus for collecting displacement sensing data, and the displacement sensor may include a gyroscope and/or a gravity sensor, such that the stylus may be equivalent to a mouse device (also referred to as an air mouse device) with respect to the electronic device.

In some possible implementations, the processing module 204 is used to generate a mouse movement event according to the displacement sensing data; and the wireless transmission module 205 is used to: send the mouse movement event.

In some possible implementations, the processing module 204 is further used to: generate the mouse movement event according to the displacement sensing data when the press type of the press input operation is a first type.

In some possible implementations, the processing module 204, the wireless transmission module 205, and the displacement sensor 206 are all provided in an interior of the stylus, the distribution positions of which are not limited to the positions shown in FIG. 3, and they may be provided in various possible positions within the stylus.

In the above embodiments, the stylus, on the basis of having a handwriting input function, also has a function of remotely controlling the electronic device. The function of the remote control may be to assist the electronic device in realizing a virtual laser display, which may be referred to as the stylus having a virtual laser function, and the function of the remote control may also be to control the shooting of the electronic device, which may be referred to as the stylus having a remote shooting control function.

Figure 4:
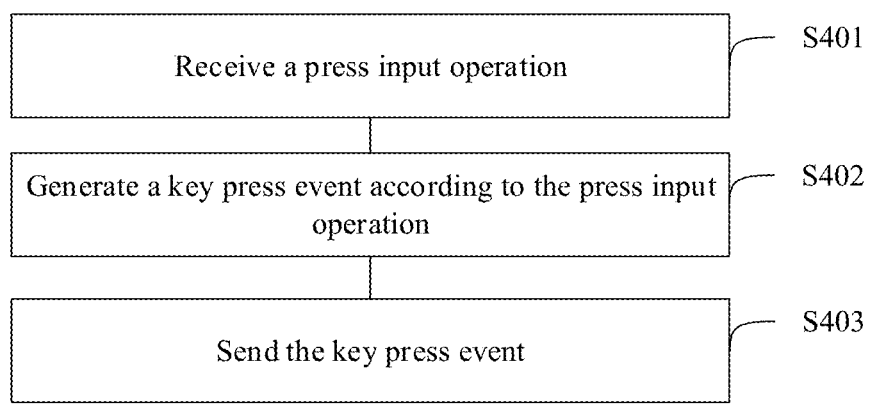
FIG. 4 is a flowchart of a control method according to some embodiments of the present disclosure.

In some embodiments of the present disclosure, a control method is provided for application to a stylus. In some possible embodiments, the stylus may be pairwise connected to an electronic device, and the pairwise connection may be a wireless connection or a wired connection. FIG. 4 is a flowchart of a control method according to some embodiments. As shown in FIG. 4, the method includes the following steps.

In step S401, a press input operation is received.

In some possible implementations, the press input operation is a press input operation for a first physical key on the stylus.

In step S402, a key press event is generated according to the press input operation.

In some possible implementations, different key press events are generated according to the press type of the press input operation.

For example, if the press input operation is a long press, a key press event with a press type of long press is generated.

For further example, when the press input operation is a single click, a key press event with the press type of single click is generated.

For further example, when the press input operation is a double-click, the key press event with the press type of double-click is generated.

For further example, when the press input operation is a triple click, a key press event with the press type of triple click is generated.

The press type may also be three or more consecutive clicks.

In step S403, the key press event is sent.

In some possible implementations, the key press event is sent via a wireless connection between the stylus and the electronic device.

Optionally, the wireless connection may be a short-range communication connection. For example, the short-range communication connection is: a Wi-Fi connection, a Bluetooth connection, an infrared connection, an NFC connection, or, a ZigBee connection.

In some possible implementations, the key press event is used to remotely control the electronic device to perform the control operation.

In some possible implementations, the stylus also collects displacement sensing data, generates a mouse movement event according to the displacement sensing data, and sends the mouse movement event.

Optionally, the stylus continuously sends the mouse movement event so that the electronic device can acquire the mouse movement event at any moment and apply the mouse movement event to other reasonable aspects.

Optionally, the stylus generates the mouse movement event according to the displacement sensing data and sends the mouse movement event only when the press type of the press input operation is a first type, which can save power consumption of the stylus.

In this embodiment, the remote control operation of the electronic device is realized through the physical key on the stylus, so that the stylus has both a handwriting input function and a remote control function, which extends the functions of the stylus, increases the richness of the functions of the stylus, improves the working efficiency of the user in using the electronic device, enables the electronic device to be better used in a variety of different scenarios, especially in the screen casting and shooting scenarios, and is also conducive to help the electronic device reduce the number of peripheral input devices.

On the one hand, it can assist the electronic device in realizing the virtual laser display, which can be referred to as the stylus having a virtual laser function, can assist the electronic device in completing the function of visual indication of the virtual laser, and can enhance the user's experience of using the screen casting demonstration.

On the other hand, it can control the shooting of the electronic device, which can be called the stylus having a remote shooting control function, can assist the electronic device to complete the remote shooting control, and can enhance the user's remote shooting experience.

On the other hand, different press types of the physical keys correspond to different remote control operations, which can achieve the diversity of the remote control operation of the electronic device.

Figure 5:
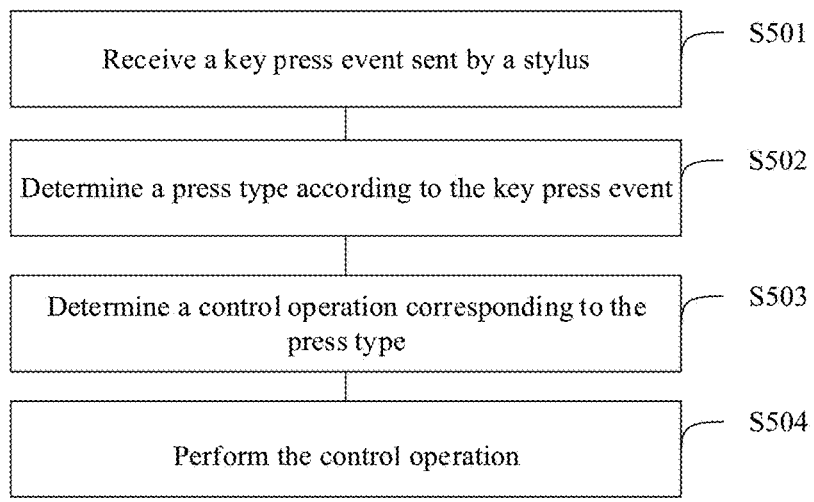
FIG. 5 is a flowchart of a control method according to some embodiments of the present disclosure.

In some embodiments of the present disclosure, a control method is provided for application to an electronic device. In some possible embodiments, the electronic device is a mobile phone device or a tablet device, etc. having a terminal operating system, which is: an Android operating system, or, an IOS operating system. The electronic device may be connected to a display device or a projection device via a wired connection or a wireless connection. FIG. 5 is a flowchart of a control method according to some embodiments. As shown in FIG. 5, the method includes the following steps.

In step S501, a key press event sent by a stylus is received.

In some possible implementations, the key press event sent by the stylus is received via a wireless connection.

Optionally, the wireless connection may be a short-range communication connection. For example, the short-range communication connection is: a Wi-Fi connection, a Bluetooth connection, an infrared connection, an NFC connection, or, a ZigBee connection.

In some possible implementations, the key press event sent by the stylus is received via a wired connection.

In some possible implementations, the electronic device receives the key press event sent by the stylus in the case that a presentation file is played on the display screen.

Optionally, the presentation file may be one of multimedia files.

For example, the presentation file may be a text file, an image file, or a video file.

The format of the text file may be: a text file (TXT) format, a power point (PPT) format, a Microsoft Word file format, a portable document format (PDF), and so on.

The format of the image file may be: a graphics interchange format (GIF), a joint photographic experts group (JPEG) format, a Portable Network Graphics (PNG) format, etc.

The format of the video file may be: an Audio Video Interleaved (AVI) format, a moving picture expert group (MPEG) format, a flash video (FLV) format, a windows media video (WMV) format, a RealMedia variable bit rate (RMVB) format, and the like.

In some possible implementations, the electronic device receives the key press event sent by the stylus in the case that an interface of the application of shooting type is displayed on the display screen. For example, the application of shooting type may be a camera application.

Figure 6:
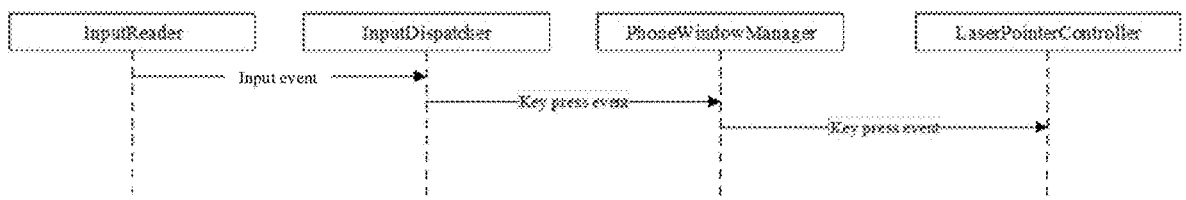
FIG. 6 is a flowchart of delivery of a key press event according to some embodiments of the present disclosure.

In some possible implementations, when implementing step S501 in a software framework layer (e.g., a Framwork layer) of the electronic device, as shown in FIG. 6, the InputReader module monitors an input event, passes the input event to the InputDispatcher module, and the InputDispatcher module recognises the input event as a key press event.

In step S502, a press type is determined according to the key press event.

In some possible implementations, different key press events correspond to different press types.

In some possible implementations, when step S501 is implemented in the software framework layer (i.e., the Framwork layer) of the electronic device, as shown in FIG. 6, after identifying the key press event, the InputDispatcher module sends the key press event to the PhoneWindowManager module, the PhoneWindowManager module sends the key press event to the LaserPointerController module, and the LaserPointerController module obtains state information of the key press event, the state information including a press type of the key press event.

In step S503, a control operation corresponding to the press type is determined.

In some possible implementations, different press types correspond to different control operations.

The manner of determining the control operation corresponding to the press type in step S503 may be various, and is described below by means of five determining manners.

First Determining Manner:

In some possible implementations, in a scenario in which the electronic device runs only an application of a non-shooting type, or, in a scenario in which the program type of the application running in the foreground is a non-shooting type, when the press type is a first type, it is determined that the control operation corresponding to the press type is a first operation, and the first operation is: performing a drawing operation on the display interface.

In an example, the first type is a long press, and the first operation is: performing the drawing operation on the display interface during the duration of the long press. Optionally, the first operation is: starting the drawing operation at a starting moment of the key press event corresponding to the long press; stopping the drawing operation at an ending moment of the key press event corresponding to the long press.

In some possible implementations, performing the drawing operation on the display interface includes: performing the drawing operation on the display interface in a current drawing mode or a default drawing mode.

Optionally, the drawing mode is a first mode, a second mode, or a third mode, where the first mode is a mode for drawing a cursor position, the second mode is a mode for drawing a cursor trajectory, and the third mode is a drawing mode other than the first mode and the second mode for assisting in the presentation. Optionally, the first mode may be referred to as a laser mode and the second mode may be referred to as a paintbrush mode.

Figure 7A:
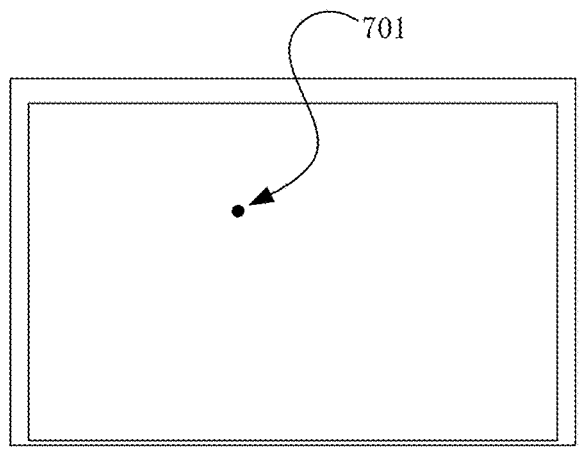
FIG. 7A is a schematic diagram for drawing a cursor position according to some embodiments of the present disclosure.

Optionally, when drawing in the first mode, an icon may be displayed on the display interface at the current position of the cursor. The icon may be a different pattern, which may be a red origin 701 as shown in FIG. 7A to simulate a laser dot, an arrowhead, a regular shape, or a non-regular personalised shape.

Figure 7B:
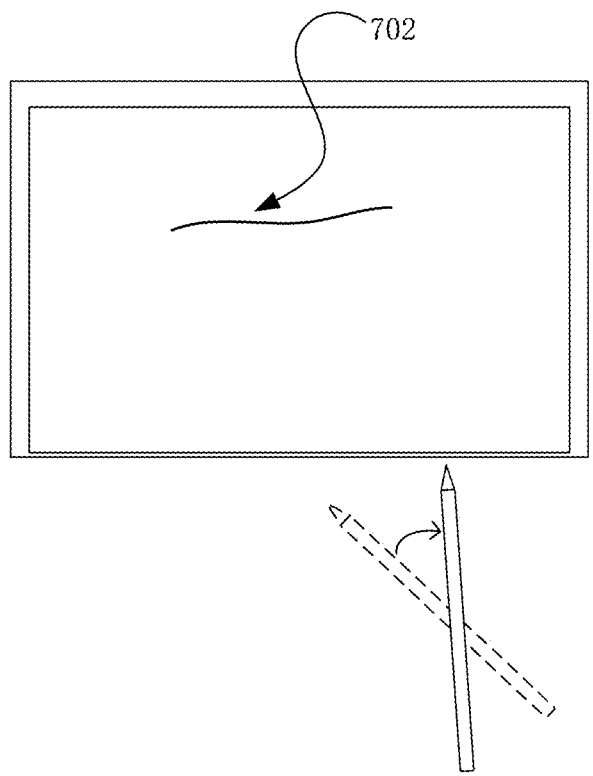
FIG. 7B is a schematic diagram for drawing a cursor trajectory according to some embodiments of the present disclosure.

Optionally, when drawing in the second mode, a paintbrush trace 702 may be displayed on the display interface, as shown in FIG. 7B, and the paintbrush trace includes a historical trajectory of the cursor.

In some possible implementations, the current drawing mode is the initial drawing mode in the case where the drawing mode has not been switched.

For example, the current drawing mode is the initial drawing mode after the electronic device is powered on or re-powered and a connection is first established with the stylus.

In some possible implementations, the current drawing mode is the drawing mode after switching the drawing mode.

For example, the current drawing mode is the second mode after the electronic device is switched from the first mode to the second mode.

In some possible implementations, a default drawing mode may be preset in the electronic device, the user may modify this default drawing mode as needed, and the default drawing mode may be the first mode, the second mode, or the third mode.

In some possible implementations, the first type is a long press, and in addition to performing the drawing operation on the display interface, the first operation also includes: setting the virtual laser function to an on state at the starting moment of the key press event, and setting the virtual laser function to an off state at the ending moment of the key press event.

Optionally, when the virtual laser function is in the on state, first indication information is displayed on the display interface, and the first indication information is used to indicate that the virtual laser function is on. For example, the display interface includes an indicator, and when the colour of the indicator is the first colour, it indicates that the virtual laser function is on.

When the virtual laser function is off, second indication information is displayed on the display interface, and the second indication information is used to indicate that the virtual laser function is on. For example, the display interface includes an indicator, and when the colour of the indicator is a second colour, it indicates that the virtual laser function is off.

The second determining manner:

In some possible implementations, in a case where the electronic device only runs an application of a non-shooting type, or, in a scenario where a program type of the application running in the foreground is of a non-shooting type, and the press type is a second type, a control operation corresponding to the press type is determined to be a second operation, and the second operation is: switching the drawing mode.

In an example, the second type is a single click.

In some possible implementations, the drawing mode is a first mode or a second mode, where the first mode is a mode for drawing a cursor position and the second mode is a mode for drawing a cursor trajectory.

Optionally, when one of the drawing modes has been turned on prior to receiving the press event, the switching of the drawing mode in this second operation is: switching from the current drawing mode to another drawing mode.

For example, in the case where the current drawing mode is the first mode and the press type is the second type, the second operation is: switching from the first mode to the second mode.

Optionally, when no drawing mode is turned on before receiving the press event, the switching drawing mode in this second operation is: switching on a drawing mode. The drawing mode may be a default drawing mode.

For example, the default drawing mode is the second mode, and when no drawing mode is turned on before receiving the press event, and the press type is the second type, the second operation is to turn on the second mode.

The Third Determining Manner

In some possible implementations, when the press type is a third type, and the current drawing mode is the second mode, the control operation corresponding to the third type is a third operation, which is: clearing the drawing trace in the second mode, where the second mode is the mode in which the cursor trajectory is drawn.

The Fourth Determining Manner:

In some possible implementations, in a scenario where the program type of the application running in the foreground is a shooting type, when the function of the current interface of the application running in the foreground is a photo-taking function, it is determined that the control operation is a fourth operation, and the fourth operation is: taking a single shot, or, a continuous shot.

In some possible implementations, the single shot may be replaced with: a single shoot, taking a single picture, taking one picture. The continuous shot may be replaced with: continuous shoot, shooting a plurality of pictures continuously, shooting continuously at a first time interval, shooting a plurality of pictures continuously at a first time interval. The first time interval is a default value in the application of the shooting type in the electronic device, and the user may adjust the value according to the usage needs.

In some possible implementations, the program type of the foreground-running application is a shooting type, the function of the current interface of the foreground-running application is a photo-taking function, and when the press type is a fourth type, it is determined that the control operation is a single shot. The fourth type may be a single click, or, a double click.

The program type of the foreground-running application is a shooting type, the function of the current interface of the foreground-running application is a photo-taking function, and when the press type is a fifth type, it is determined that the control operation is a continuous shot. The fifth type is different from the fourth type.

Figure 7C:
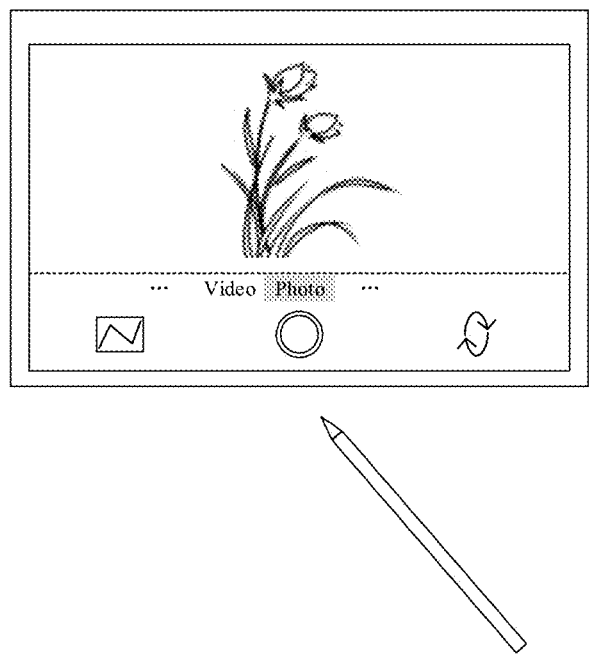
FIG. 7C is a schematic diagram of a fourth operation according to some embodiments of the present disclosure.

For example, when the fourth type is single click and the fifth type is double click, as shown in FIG. 7C, the single-shot operation is performed by clicking the key of the stylus, and the continuous-shot operation is performed by double-clicking the key of the stylus. When the fourth type is double-click, and the fifth type is single-click, as shown in FIG. 7C, the single-shot operation is performed by double-clicking the key of the stylus, and the continuous-shot operation is performed by clicking the key of the stylus.

In some possible implementations, in a scenario where the program type of the foreground-running application is a shooting type, the function of the current interface of the foreground-running application is a photo-taking function, and the press type is a long press type, it is determined that the control operation is to start the continuous shot at the starting moment of the key press event and to stop the continuous shot at the ending moment of the key press event.

In this implementation, the user can control the duration of the continuous shot by the long press, and when more photos need to be taken, the user can control the duration of the long press to be longer, such as 3 seconds, 5 seconds, or 10 seconds, and when fewer photos need to be taken, the user can control the duration of the long press to be shorter, such as 1 second or 2 seconds. It can satisfy the demand that the user can control the duration of the continuous shot as needed.

The fifth determining manner:

In some possible implementations, in the case where the program type of the foreground running application is a shooting type, and the function of the current interface of the foreground running application is a video recording function, the running state of the function of the current interface is that the video recording has not been started, and, the press type is a sixth type, the control operation is determined to be: starting the video recording.

In an example, the sixth type is a single click or a double click.

In some possible implementations, in the case where the program type of the foreground running application is a shooting type, and the function of the current interface of the foreground running application is a video recording function, the running state of the function of the current interface is that the video recording has not been started, and, the press type is a seventh type, the control operation is determined to be: stopping the video recording.

Figure 7D:
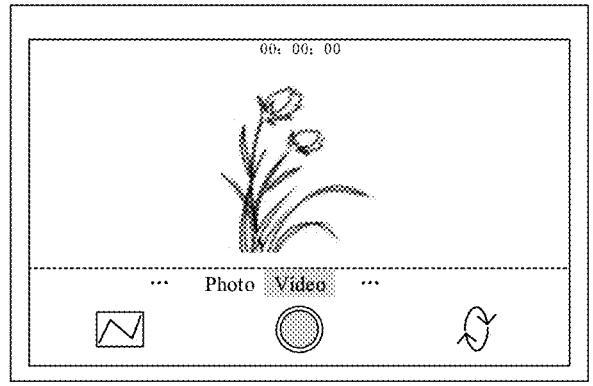
FIG. 7D is a schematic diagram of starting a video recording according to some embodiments of the present disclosure.
Figure 7E:
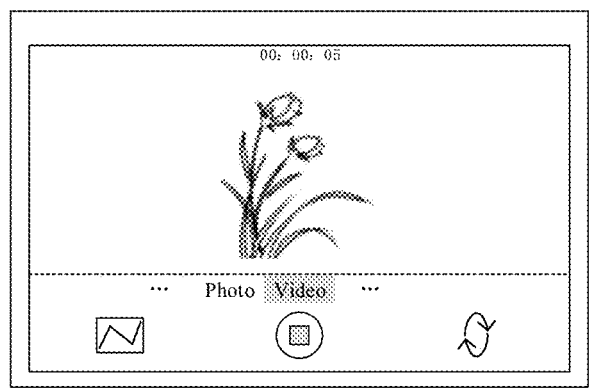
FIG. 7E is a schematic diagram of ending a video recording according to some embodiments of the present disclosure.

Optionally, the seventh type is the same as the sixth type; for example, when the sixth type is single-click, as shown in FIG. 7D, clicking the key of the stylus starts the video recording, and the seventh type is also single-click, as shown in FIG. 7E, clicking the key of the stylus stops the video recording during the video recording.

Optionally, the seventh type is different from the sixth type; e.g., when the sixth type is a single click, as shown in FIG. 7D, clicking the key of the stylus starts the video recording, and when the seventh type is a double click, as shown in FIG. 7E, during the video recording, double clicking the key of the stylus key stops the video recording.

In some possible implementations, in the case where the program type of the application running in the foreground is a recording type, and the function of the current interface of the application running in the foreground is a video recording function, and the running state of the function of the current interface is that the video recording has not been started, and the press type is a long press type, the video recording is started at the starting moment of the key press event, and the video recording is stopped at the ending moment of the key press event.

In this implementation, the user can control the duration of the video recording by the long press, and when a longer video needs to be recorded, the user can control the duration of the long press to be longer, such as 3 seconds, 5 seconds or 10 seconds, and when a shorter video needs to be recorded, the user can control the duration of the long press to be shorter, such as 1 second or 2 seconds. The demand that the user can control the recording duration as needed can be met.

In step S504, the control operation is performed.

In some possible embodiments, the control operation in steps S503 and S504 is to perform a drawing operation in the second mode, and, after step S504, the following step is further included: in the case of receiving a touch operation with respect to the display screen, clearing the drawing trajectory in the second mode in response to the touch operation.

In the embodiments of the present disclosure, the remote control operation controlled by the stylus is realized. On the one hand, by making modifications to the framework layer of the operating system, other operating systems (e.g., Android) than the operating system (e.g., Windows/MAC) that matches the virtual laser pointer can also implement the virtual laser function, so that the virtual laser display can be implemented without the aid of a laser pointer; and the problem that the physical laser pointer and the digital laser pointer can not be used when casting the screen to a large screen by an electronic device that supports other operating systems (e.g., Android) or projecting through a projector is overcome, the office efficiency of the user for using the electronic device that supports other operating systems (such as Android) is improved, and the user's experience of the projection of the screen demonstration is enhanced. On the other hand, the remote shooting controlled by the stylus can be achieved, and the user's remote shooting experience can be enhanced. On the other hand, different remote control operations can be realized through different press types, which can realize the diversity of remote control operations.

Figure 8:
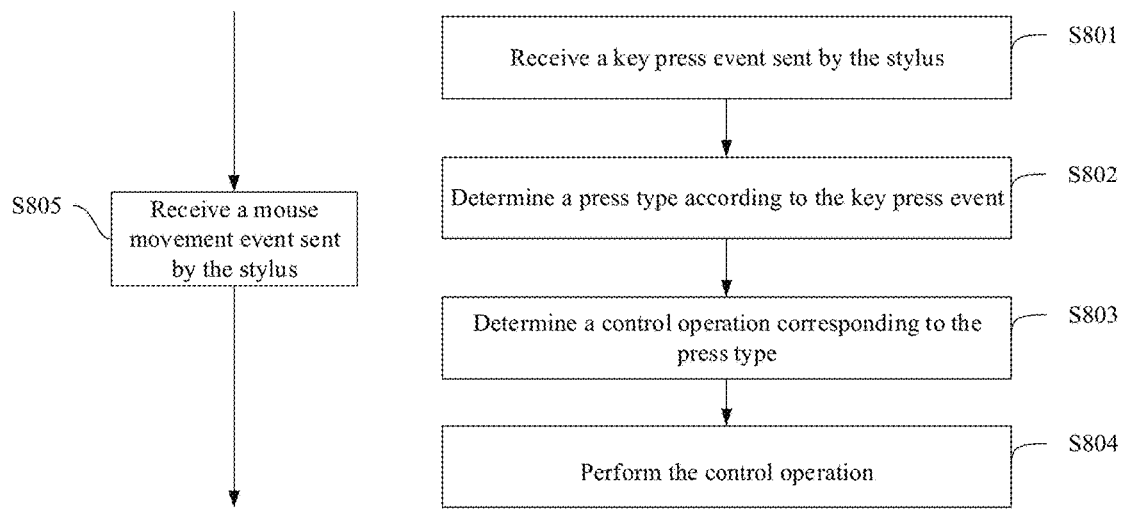
FIG. 8 is a flowchart of a control method according to some embodiments of the present disclosure.

In some embodiments of the present disclosure, a control method is provided for application to an electronic device. FIG. 8 is a flowchart of a control method according to some embodiments. As shown in FIG. 8, the control method includes the following step.

In step S801, a key press event sent by the stylus is received.

Step S801 has the same content as step S501, and will not be repeated herein.

In step S802, a press type is determined according to the key press event.

Step S802 has the same content as step S502, and will not be repeated here.

In step S803, a control operation corresponding to the press type is determined.

Step S803 has the same content as step S503, and will not be repeated here.

In step S804, the control operation is performed.

The content of performing the control operation in step S804 includes the content of performing the control operation in step S504.

The control method further includes: step S805 that is executed in parallel with steps S801 to S804 in the course of steps S801 to S804, where step S805 is: receiving a mouse movement event sent by the stylus.

Optionally, in step S805, a mouse movement event sent by the stylus is received continuously at a second time interval.

In some possible implementations, steps S501 to step S504 are executed in a first process and step S805 is executed in a second process, where the first process and the second process are executed in parallel.

In step S804, when the control operation performed is a first operation (the first operation is performing a drawing operation on the display interface), performing the drawing operation on the display interface includes: performing the drawing operation on the display interface according to product information of the stylus and the mouse movement event.

In an embodiment, performing the drawing operation on the display interface according to the product information of the stylus and the mouse movement event includes the following step S1, step S2, and step S3.

In step S1: it is determined that the stylus has a virtual laser function according to the product information of the stylus.

In an embodiment, the product information of the stylus includes information that can uniquely identify the stylus, such as a device manufacturer and a product number. A condition for determining that the stylus has the virtual laser function is pre-configured in the electronic device, the condition being that the product information is that the device manufacturer is a known manufacturer, and, the product number is greater than a set value. After the electronic device acquires the product information of the stylus, if the product information meets the pre-configured condition, it is determined that the stylus has the virtual laser function, otherwise, it is determined that the stylus does not have the virtual laser function.

It is to be noted that after determining that the stylus has the virtual laser function, the virtual laser function may be turned on at a setting function control of the electronic device. Optionally, a switch button for turning on the virtual laser function of the stylus is provided in the system settings of the electronic device.

In step S2: an event type of the mouse movement event is modified from a mouse cursor type to a virtual laser type.

Figure 9:
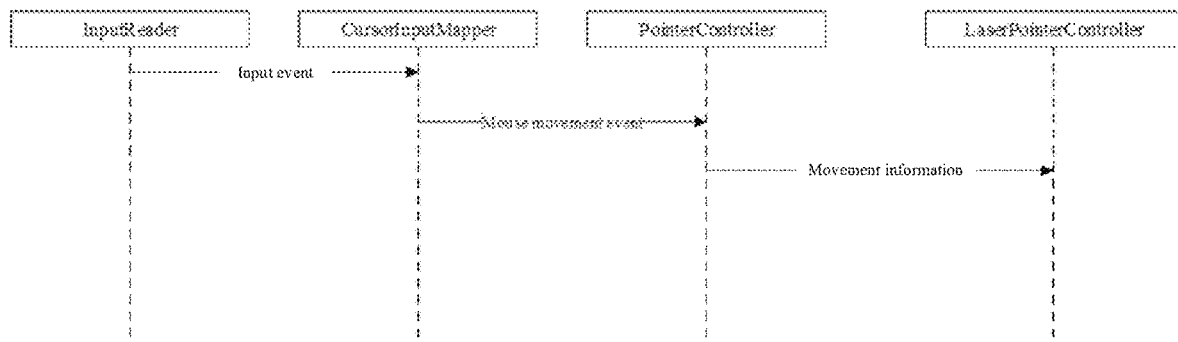
FIG. 9 is a flowchart of delivery of a mouse movement event according to some embodiments of the present disclosure.

In some implementations, FIG. 9 is a flowchart of the delivery of a mouse movement event according to some embodiments. As shown in FIG. 9, at a software framework layer of the electronic device, the InputReader module monitors an input event, and when it recognises the input event as a mouse movement event, it sends the mouse movement event to the CursorInputMapper module. The CursorInputMapper module obtains the movement information in the mouse movement event, and the movement information includes: the event type of the mouse movement event, the real-time position of the cursor, the display mode of the cursor, etc., where the display mode of the cursor includes fade of the cursor, unfade of the cursor, etc., and after modifying the event type of the mouse movement event in the movement information from the mouse cursor type to the virtual laser type, the PointerController module sends the movement information to the LaserPointerController module.

In step S3: a drawing operation is performed on the display interface according to the mouse movement event.

In some implementations, step 3 includes the following steps.

In step S3-1: positional movement information in the mouse movement event is obtained.

In step S3-2: a laser cursor processing logic corresponding to the virtual laser type is invoked, and the drawing operation is performed on the display interface according to the positional movement information through the laser cursor processing logic.

In some possible embodiments, when the current drawing mode is the first mode, each time a new mouse movement event is received, the positional movement information of the mouse movement event is determined, and at the position corresponding to the positional movement information on the display interface, the laser point is displayed. Therefore, only one laser point is displayed on the display interface, the laser point is a laser point corresponding to the positional movement information of the latest mouse movement event, and the position of the laser point keeps changing as new mouse movement events are continuously received.

In some possible implementations, when the current drawing mode is the second mode, each time a new mouse movement event is received, the positional movement information of the mouse movement event is determined and recorded, a corresponding sequence of positions on the display interface is determined according to the respective positional movement information recorded, and a trajectory line is drawn on the sequence of positions to form a paintbrush trace. Therefore, as a new mouse movement event is continuously received, the trajectory line is continuously extended and the paintbrush traces are continuously increased.

In some possible implementations, performing a drawing operation on the display interface according to the positional movement information in step S3-2 includes: in a drawing window, invoking a laser view (LaserView) and using the laser view to draw according to the positional movement information. Optionally, the LaserView supports drawing a cursor position, or, drawing a cursor trajectory.

In an example, in the software framework layer of the electronic device, the laser view is pre-created, i.e., a custom view is encapsulated, e.g., the custom view is referred to as LaserView, and the Laser View provides a first interface for drawing the cursor position, and, a second interface for drawing the cursor trajectory. A drawing window is created through the WindowManager module, and when the PointerController module modifies the event type of the mouse movement event from the mouse cursor type to the virtual laser type, the pointer control of the drawing window is invoked in order to display the pointer display of the set virtual laser type in the drawing window. When the drawing window receives a request to invoke the pointer control of the PointerController module, it takes the laser view as the root view, whereby a drawing control appears on the display interface of the electronic device, and when the drawing operation is executed, it invokes the first interface or the second interface of the laser view so that the laser view (LaserView) completes the drawing operation according to the positional movement information of the mouse movement event, i.e., the drawing result can be displayed on the display interface.

In the above embodiments, the mouse movement event is received in real time in the process of realizing remote control, i.e., the mouse movement event can be acquired at any moment, and when the first operation is performed, the first operation is completed according to the mouse movement event, and it is also possible to apply the mouse movement event to other reasonable aspects when other operations are performed.

Figure 10:
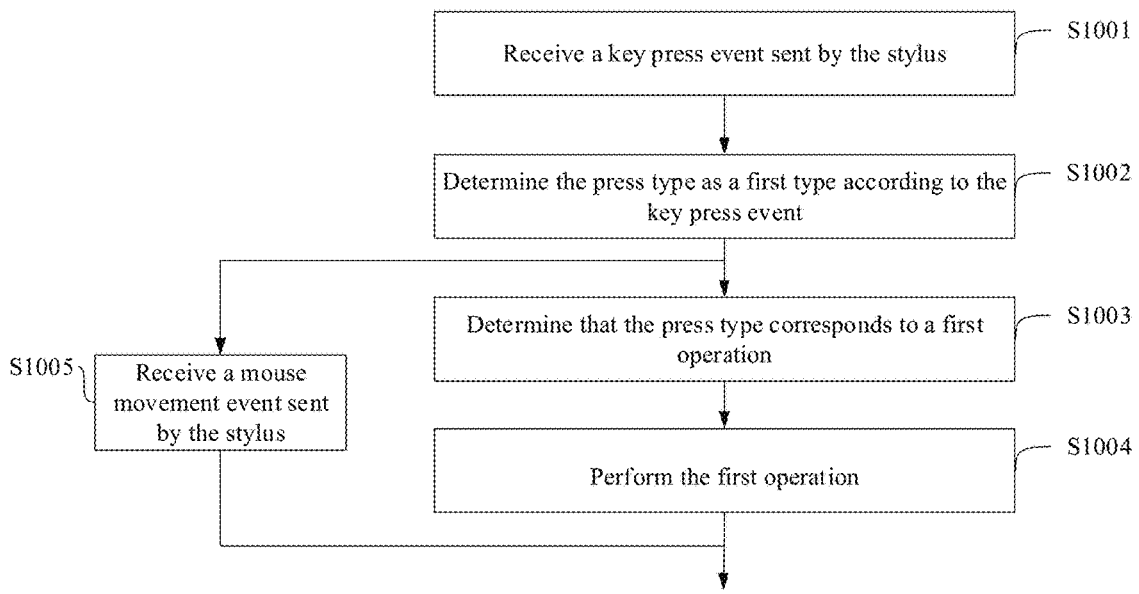
FIG. 10 is a flowchart of a control method according to some embodiments of the present disclosure.

In some embodiments of the present disclosure, a control method is provided for application to an electronic device. FIG. 10 is a flowchart of a control method according to some embodiments. As shown in FIG. 10, the control method includes the following steps.

In step S1001, a key press event sent by the stylus is received.

Step S1001 has the same content as step S501, and will not be repeated herein.

In step S1002, the press type is determined as a first type according to the key press event.

The content of determining that the press type is the first type according to the key press event in step S1002 is the same as the content of determining that the press type is the first type according to the key press event in step S502, and will not be repeated here.

In step S1003, it is determined that the press type corresponds to a first operation.

The content of determining that the press type corresponds to the first control operation in step S1003 is the same as the content of determining that the press type corresponds to the first control operation in step S503, and will not be repeated here.

In step S1004, the first operation is performed.

The content of performing the first operation in step S1004 is the same as the content of performing the first operation in step S704, and will not be repeated herein.

The control method further includes: step S1005 executed in parallel with steps S1002 to S1004 in the course of steps S1002 to S1004, and step S1005 is: receiving a mouse movement event sent by the stylus.

In the above embodiment, the mouse movement event is received only when the first operation is required, matching the way the stylus sends the mouse movement event.

Figure 11:
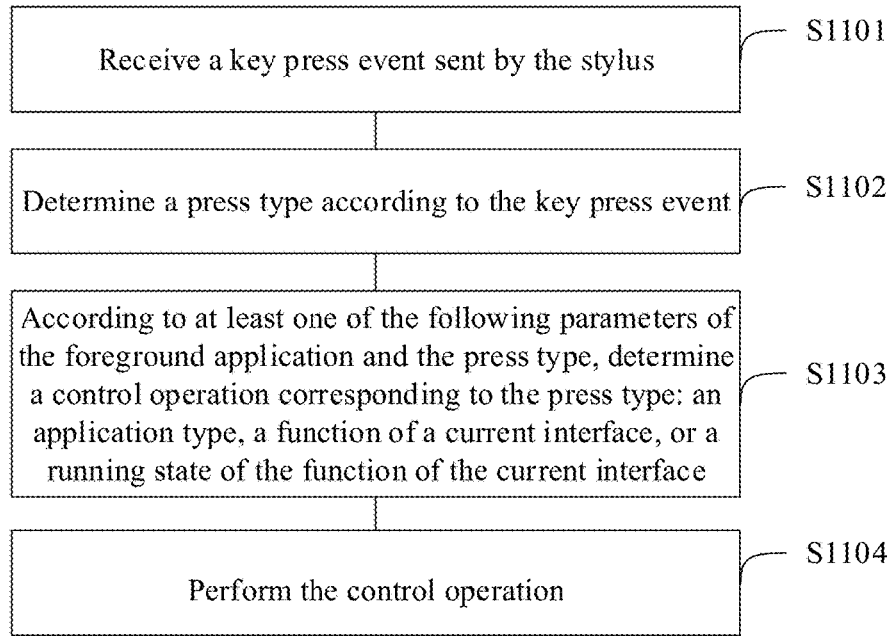
FIG. 11 is a flowchart of a control method according to some embodiments of the present disclosure.

In some embodiments of the present disclosure, a control method is provided to be applied to an electronic device. FIG. 11 is a flowchart of a control method according to some embodiments. As shown in FIG. 11, the method includes the following steps.

In step S1101, a key press event sent by the stylus is received.

Step S1101 has the same content as step S501, and will not be repeated herein.

In step S1102, a press type is determined according to the key press event.

Step S1102 has the same content as step S502, and will not be repeated here.

In step S1103, according to at least one of the following parameters of the foreground application and the press type, a control operation corresponding to the press type is determined: an application type, a function of a current interface, or a running state of the function of the current interface.

In an example, the application type of the foreground application is a shooting type, or, a non-shooting type.

When the foreground application is a shooting application, its application type is a shooting type. For example, the shooting application may be a photo-taking application, a video recording application, or a camera application. Among them, the camera application includes a photo-taking function and a video recording function.

The application of non-shooting type is an application other than a shooting application, for example: the application of non-shooting type is: a PPT application, a Microsoft Word application, a PDF application, an image display application, a video display application.

In some possible embodiments, the same press type corresponds to a different control operation when the application type of the foreground application is different; and/or the same press type corresponds to a different control operation when the function of the current interface of the foreground application is different.

The manner of determining the control operation corresponding to the press type in step S1103 may be various, and is described below by means of five determining manners.

The First Determining Manner:

When it is determined that the program type of the application running in the foreground is a non-shooting type, and the press type is a first type, it is determined that the control operation corresponding to the press type is a first operation, which is: performing a drawing operation on the display interface.

The contents of the first type and the first operation in step S1103 are the same as the contents of the first type and the first operation in step S503, and will not be repeated here.

The Second Determining Manner:

When it is determined that the program type of the application running in the foreground is a non-shooting type, and the press type is a second type, it is determined that the control operation corresponding to the press type is a second operation, and the second operation is: switching the drawing mode.

The contents of the second type and the second operation in step S1103 are the same as the contents of the second type and the second operation in step S503, and will not be repeated here.

The Third Determining Manner:

When it is determined that the press type is a third type, and the current drawing mode is a second mode, it is determined that the control operation corresponding to the third type is a third operation, which is: clearing the drawing trace in the second mode, where the second mode is a mode for drawing a cursor trajectory.

The Fourth Determining Manner:

When it is determined that the program type of the foreground-running application is a shooting type, and the function of the current interface of the foreground-running application is a photo-taking function, it is determined that the control operation is a fourth operation, and the fourth operation is: taking a single shot, or, a continuous shot.

In some possible implementations, it is determined that the program type of the foreground-running application is a shooting type, and the function of the current interface of the foreground-running application is a photo-taking function, and when the press type is the fourth type, it is determined that the control operation is a single shot.

In some possible implementations, it is determined that the program type of the foreground-running application is a shooting type, and the function of the current interface of the foreground-running application is a photo-taking function, and when the press type is a fifth type, it is determined that the control operation is a continuous shot.

In some possible embodiments, when it is determined that the program type of the foreground-running application is the shooting type, and the function of the current interface of the foreground-running application is the photo-taking function, and when the press type is the long press type, it is determined that the control operation is: starting the continuous shot at the starting moment of the key press event, and stopping the continuous shot at the ending moment of the key press event.

The content of the fourth operation in step S1103 is the same as the content of the fourth operation in step S503, and will not be repeated here.

The Fifth Determining Manner:

In some possible embodiments, it is determined that the program type of the foreground-running application is a shooting type, the function of the current interface of the foreground-running application is a video recording function, the running state of the function of the current interface is that the video recording has not been started, and when the press type is a sixth type, the control operation is determined to be: starting video recording.

In some possible embodiments, it is determined that the program type of the foreground running application is a shooting type, the function of the current interface of the foreground running application is a video recording function, the running state of the function of the current interface is that the video recording has been started, and, when the press type is a seventh type, it is determined that the control operation is: stopping the video recording.

In some possible implementations, when it is determined that the program type of the foreground running application is a shooting type, the function of the current interface of the foreground running application is a video recording function, the running state of the function of the current interface is that the video recording has not been started, and, when the press type is a long press type, it is determined that the control operation is: starting the video recording at the starting moment of the key press event, and stopping the video recording at the ending moment of the key press event.

In step S1104, the control operation is performed.

In some possible implementations, the control method further includes: continuously receiving a mouse movement event sent by the stylus during the process of step S1101 to step S1104.

In some possible implementations, the control method further includes: continuously receiving the mouse movement event sent by the stylus during the process from step S1103 to step S1104 when the control operation is determined to be the first operation in step S1103.

In the above embodiment, after determining the press type, the control operation corresponding to the press type is determined according to at least one parameter of the foreground application, and when the at least one parameter of the foreground application is different, different control operations are performed for the same press type, which can cause the user to perform different operations on different applications, and in particular, the user can be caused to perform different operations on different applications using the same press operation, thereby improving the usage experience of the user.

Figure 12:
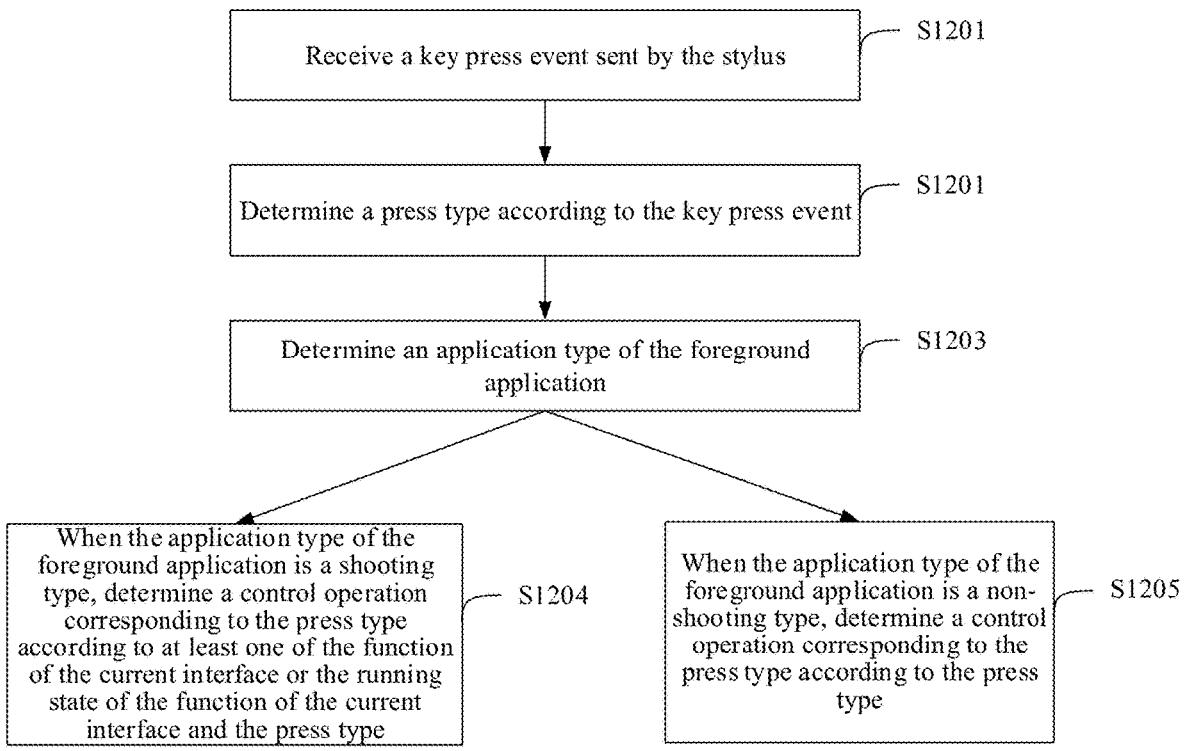
FIG. 12 is a flowchart of a control method according to some embodiments of the present disclosure.

In some embodiments of the present disclosure, a control method is provided for application to an electronic device. FIG. 12 is a flowchart of a control method according to some embodiments. As shown in FIG. 12, the control method includes the following steps.

In step S1201, a key press event sent by the stylus is received.

Step S1201 has the same content as step S501, and will not be repeated herein.

In step S1202, a press type is determined according to the key press event.

Step S1202 has the same content as step S502, and will not be repeated here.

In step S1203, an application type of the foreground application is determined.

In step S1204, when the application type of the foreground application is a shooting type, a control operation corresponding to the press type is determined according to at least one of the function of the current interface or the running state of the function of the current interface and the press type.

In some possible implementations, the application of which the application type is a shooting type is a shooting application. For example, the shooting application may be a photo-taking application, a video recording application, or a camera application. The camera application includes a photo-taking function and a video recording function.

In some possible implementations, determining a control operation corresponding to the press type according to at least one of the function of the current interface or the running state of the function of the current interface and the press type includes:

determining the control operation to be a third operation according to that the program type of the foreground-running application is a shooting type, and, the function of the current interface of the foreground-running application is a photo-taking function, the third operation being: a single shot, or, a continuous shot.

The content regarding the third operation in this embodiment is the same as the content regarding the third operation in the third determining manner in step S503, and will not be repeated here.

In some possible embodiments, determining the control operation corresponding to the press type according to at least one of the function of the current interface or the running state of the function of the current interface and the press type includes:

determining the control operation to be: starting the video recording according to that the program type of the foreground-running application is a shooting type, the function of the current interface of the foreground-running application is a video recording function, the running state of the function of the current interface is that the video recording has not been started, and, when the press type is a sixth type;

and/or determining the control operation to be: stopping the video recording according to that the program type of the foreground-running application is a shooting type, the function of the current interface of the foreground-running application is a video recording function, the running state of the function of the current interface is that the video recording has not been started, and, when the press type is a seventh type.

In some possible embodiments, determining the control operation corresponding to the press type according to at least one of the function of the current interface or the running state of the function of the current interface and the press type, includes:

according to that the program type of the foreground-running application is a shooting type, the function of the current interface of the foreground-running application is a video recording function, the running state of the function of the current interface is that the video recording has not been started, and, the press type is a long press type, determining the control operation corresponding to the press type to be: starting the video recording at the starting moment of the key press event, and stopping the video recording at the ending moment of the key press event.

In step S1205, when the application type of the foreground application is a non-shooting type, the control operation corresponding to the press type is determined according to the press type.

In some possible implementations, the application of the non-shooting type is an application other than the shooting application, for example, the application of the non-shooting type is: a PPT application, a Microsoft Word application, a PDF application, an image display application, a video display application.

In some possible implementations, when the press type is a first type, it is determined that the control operation corresponding to the press type is a first operation, and the first operation is: performing a drawing operation on the display interface.

The contents regarding the first type and the first operation in this embodiment are the same as the contents regarding the first type and the first operation in the first determining manner in step S503, and will not be repeated here.

In some possible implementations, when the press type is a second type, the control operation corresponding to the press type is determined to be a second operation, and the second operation is: switching the drawing mode.

The contents regarding the second type and the second operation in this embodiment are the same as the contents regarding the second type and the second operation in the second determining manner in step S503, and will not be repeated herein.

In some embodiments of the present disclosure, a control method is provided, and the control method can be applied to a scene in which a currently applied type is a non-shooting type. The control method includes the following steps.

In step 1, the stylus detects a single click press operation against a first physical key (which may be referred to as a focus key), and sends a first press event with a press type of single click to the electronic device.

The single click corresponds to a second operation.

In step 2, the electronic device receives the first press event, determines and performs a control operation corresponding to the first press event according to its press type being a single click: turning on the second mode (or referred to as the paintbrush mode).

In an embodiment, since the drawing mode before receiving the first press event is a first mode, after receiving the first press event, the first mode is switched to the second mode, thereby switching on the second mode.

In an embodiment, since no drawing mode has been turned on prior to receiving the first press event and the second mode is the default drawing mode, the second mode is turned on after receiving the first press event.

In step 3, the stylus receives a long press operation against the first physical key (which may be referred to as the focus key), and sends a second press event with a press type of long press to the electronic device.

The long press corresponds to the first operation.

In step 4, the electronic device receives the second press event, determines and performs a control operation corresponding to the second press event according to its press type being long press: performing drawing on the display interface. Since the current drawing mode is the second mode, the cursor trajectory is drawn on the display interface.

In step 5, the electronic device stops drawing the cursor trajectory on the display interface at the end of the second press event.

In step 6, the stylus receives a double-click press operation against the first physical key (which may be referred to as the focus key), and sends a third press event with a press type of long press to the electronic device.

The double-tap corresponds to a third operation.

In step 7, the electronic device receives the third press event, determines and performs a control operation corresponding to the second press event according to its press type being a double click: clearing the drawing trace in the second mode.

Figure 13:
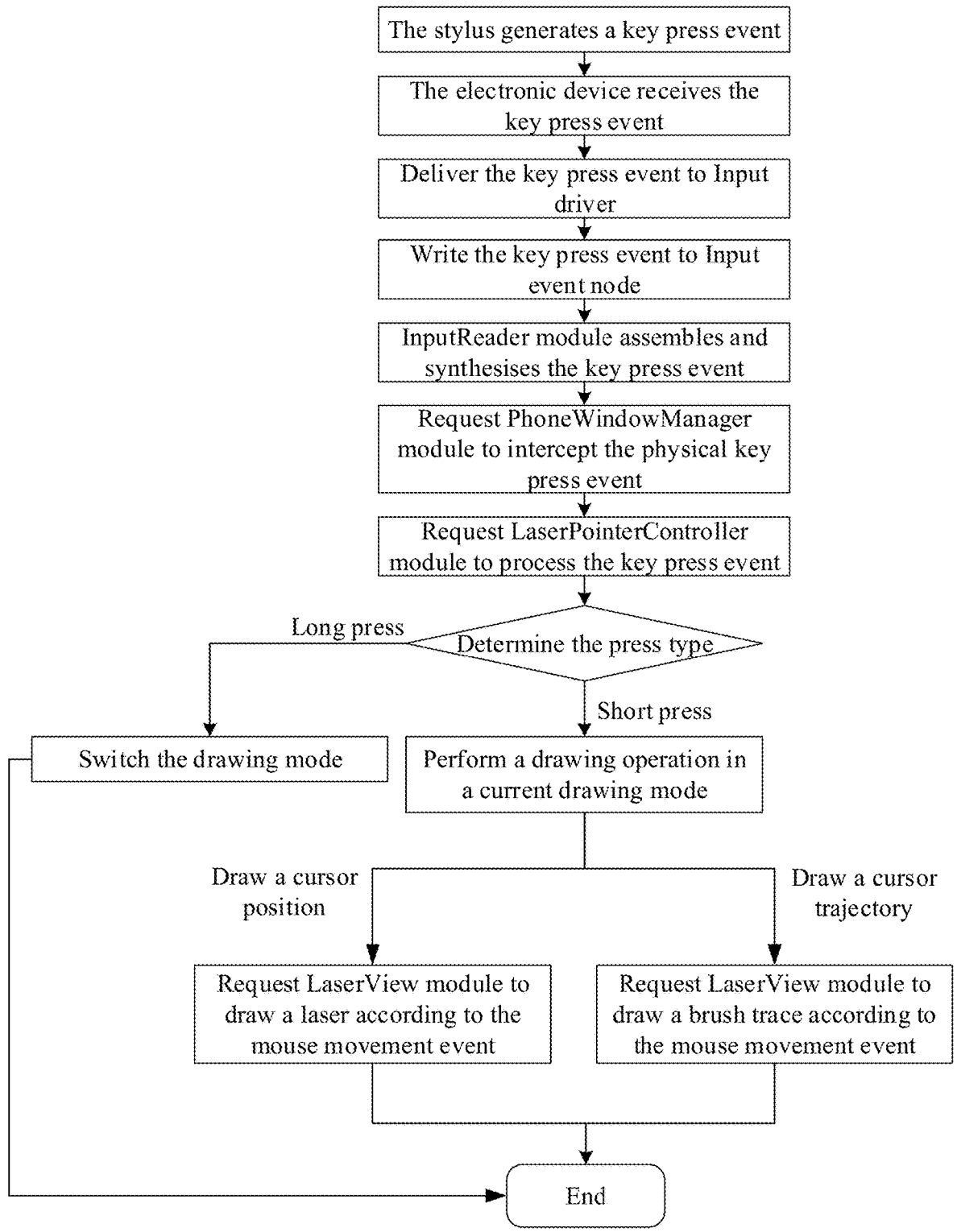
FIG. 13 is a flowchart of a control method according to some embodiments of the present disclosure.

In some embodiments of the present disclosure, a control method is provided to be applied to an electronic device. FIG. 13 is a flowchart of a control method according to some embodiments. As shown in FIG. 13, the method includes the following steps.

In step S1301, a press input operation is received on the stylus, a key press event is generated according to the press input operation, and the key press event is sent to the electronic device.

In step S1302, the electronic device receives the key press event via wireless communication.

In step S1303, the key press event is delivered to the Input driver.

In step S1304, the Input driver writes the key press event to the Input event node.

In step S1305, the InputReader module assembles and synthesizes the key press event.

In step S1306, the InputDispatcher module requests the PhoneWindowManager module (policy) to intercept the physical key press event.

In step S1307, the PhoneWindowManager module requests the LaserPointerController module to process the key press event.

In step S1308, the LaserPointerController module makes a judgement on the physical key press event to determine the press type.

If the press type is a long press, step S1310-step S1312 are performed; if the press type is a short press, step S1309 is performed.

In step S1309, the drawing mode is switched and the process is ended.

In step S1310, in the current drawing mode, the drawing operation is performed.

In step S1311, if the current drawing mode is a mode for drawing the cursor position, the LaserView module is requested to draw the laser according to the mouse movement event.

In step S1312, if the current drawing mode is a mode for drawing a cursor trajectory, the LaserView module is requested to draw a paintbrush trace according to the mouse movement event.

Figure 14:
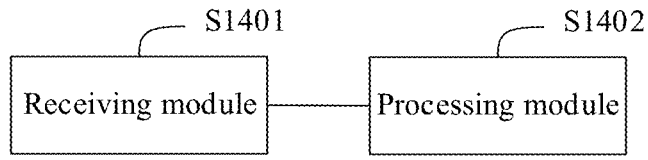
FIG. 14 is a block diagram of an electronic apparatus according to some embodiments of the present disclosure.

In some embodiments of the present disclosure, an electronic apparatus is provided. FIG. 14 is a block diagram of an electronic apparatus according to some embodiments. As shown in FIG. 14, the electric apparatus includes:
 a receiving module 1401, configured to receive a key press event sent by a stylus;
 a processing module 1402, configured to determine a press type according to the key press event; determine a control operation corresponding to the press type, and perform the control operation, where a different press type corresponds to a different control operation.

In some possible implementations, the processing module 1402 is further configured to determine a control operation corresponding to the press type using a method of:
 determining a control operation corresponding to the press type according to at least one of the following parameters of the foreground application and the press type:
 an application type;
 a function of a current interface;
 a running state of the function of the current interface.

In some possible implementations, the same press type corresponds to a different control operation when the application type of the foreground application is different; and/or, the same press type corresponds to a different control operation when the function of the current interface of the foreground application is different.

In some possible implementations, when the press type is a first type, a control operation corresponding to the first type is: performing a drawing operation on the display interface.

In some possible implementations, the processing module 1402 is further configured to perform a drawing operation on the display interface in a current drawing mode or a default drawing mode;
 where the current drawing mode is a drawing mode after switching the drawing mode; or
 the current drawing mode is an initial drawing mode without having switched the drawing mode.

In some possible implementations, the receiving module 1401 is further configured to receive a mouse movement event sent by the stylus;
 the processing module 1402 is further configured to perform a drawing operation on the display interface according to product information of the stylus and the mouse movement event.

In some possible implementations, the processing module 1402 is further configured to perform a drawing operation on the display interface according to the product information of the stylus and the mouse movement event by using the following method:
 determining that the stylus has a virtual laser function according to the product information of the stylus;
 modifying an event type of the mouse movement event from a mouse cursor type to a virtual laser type;
 performing a drawing operation on a display interface according to the mouse movement event.

In some possible implementations, the processing module 1402 is further configured to perform a drawing operation on the display interface according to the mouse movement event by using a method, which includes:
 obtaining positional movement information in the mouse movement event;
 invoking a laser cursor processing logic corresponding to the virtual laser type;
 by means of the laser cursor processing logic, performing a drawing operation on the display interface according to the positional movement information.

In some possible implementations, the processing module 1402 is further configured to perform a drawing operation on the display interface according to the positional movement information by using the following method:
 invoking a laser view in a drawing window, and drawing according to the positional movement information using the laser view;
 where the laser view supports drawing a cursor position, or, drawing a cursor trajectory.

In some possible implementations, when the press type is a second type, a control operation corresponding to the second type is: switching the drawing mode.

In some possible implementations, the drawing mode is a first mode or a second mode; where the first mode is a mode for drawing a cursor position and the second mode is a mode for drawing a cursor trajectory.

In some possible implementations, the press type is a third type, and when the current drawing mode is the second mode, the control operation corresponding to the third type is: clearing a drawing trace in the second mode, where the second mode is a mode of drawing a cursor trajectory.

In some possible implementations, the program type of the foreground running application is a shooting type, and when the function of the current interface of the foreground running application is a photo-taking function, the control operation is: a single shot, or, a continuous shot.

In some possible implementations, when the press type is a fourth type, the control operation corresponding to the fourth type is a single shot; or
 when the press type is a fifth type, the control operation corresponding to the fifth type is a continuous shot;
 where the fourth type and the fifth type are different.

In some possible implementations, the processing module 1402 is further configured to determine, when the press type is a long press type, that the control operation is: starting continuous shot at a starting moment of the key press event and stopping continuous shot at an ending moment of the key press event.

In some possible implementations, in the case where the program type of the foreground running application is of the shooting type, and the function of the current interface of the foreground running application is a video recording function, when the running state of the function of the current interface is that video recording is not started, and, the press type is a sixth type, the control operation is starting the video recording;

when the running state of the function of the current interface is that the video recording has been started, and, the press type is a seventh type, the control operation is stopping the video recording;

where the sixth type and the seventh type are the same or different.

In some possible implementations, when the program type of the foreground running application is a shooting type, the function of the current interface of the foreground running application is a video recording function, the running state of the function of the current interface is that video recording has not been started, and, the press type is a long press type, the control operation is: starting the video recording at the starting moment of the key press event, and stopping the video recording at the ending moment of the key press event.

With respect to the apparatuses in the above embodiments, the specific manners for performing operations for individual modules therein have been described in detail in the embodiments regarding the methods, which will not be elaborated herein.

Figure 15:
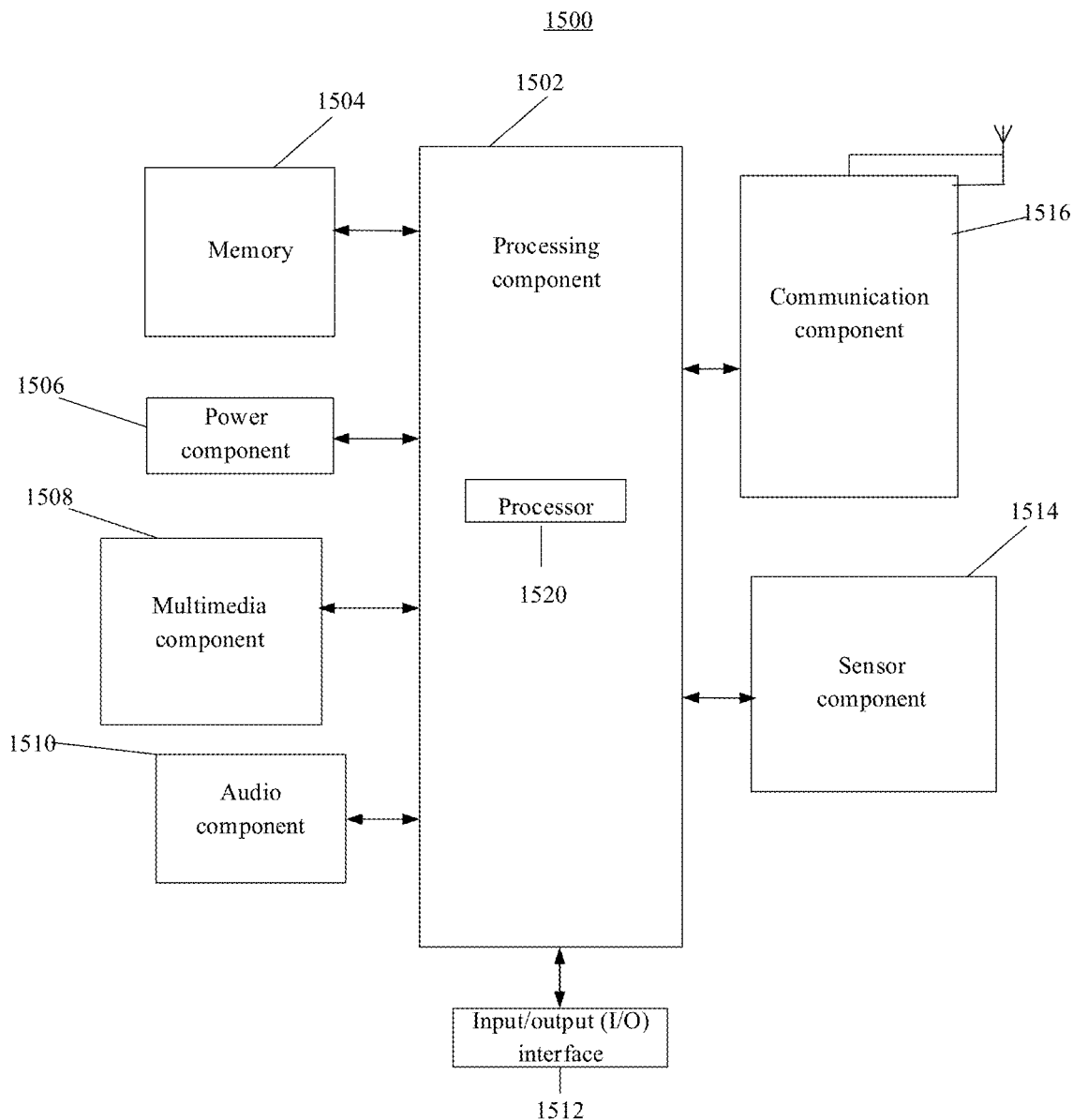
FIG. 15 is a block diagram of an electronic device according to some embodiments of the present disclosure.

FIG. 15 is a block diagram of an electronic device 1500 according to some embodiments of the present disclosure.

Referring to FIG. 15, the electronic device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the electronic device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the electronic device 1500. Examples of such data include instructions for any applications or methods operated on the electronic device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the electronic device 1500. The power component 1506 may include a power management system, one or more power sources, and any other components associated with the generation, management, and distribution of power in the electronic device 1500.

The multimedia component 1508 includes a screen providing an output interface between the electronic device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the electronic device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone (MIC) configured to receive an external audio signal when the electronic device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1502 provides an interface between the processing component 1502 and peripheral interface modules, such as a keyboard, a click wheel, keys, and the like. The keys may include, but are not limited to, a home key, a volume key, a starting key, and a locking key.

The sensor component 1514 includes one or more sensors to provide status assessments of various aspects of the electronic device 1500. For instance, the sensor component 1514 may detect an open/closed status of the electronic device 1500, relative positioning of components, e.g., the display and the keypad, of the electronic device 1500, a change in position of the electronic device 1500 or a component of the electronic device 1500, a presence or absence of user contact with the electronic device 1500, an orientation or an acceleration/deceleration of the electronic device 1500, and a change in temperature of the electronic device 1500. The sensor component 1514 may include a proximity sensor configured to detect the presence of nearby objects without any physical contact. The sensor component 1514 may also include a photosensitive sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the electronic device 1500 and other devices. The electronic device 1500 may access a wireless network based on a communication standard, such as WiFi, 2G, 3G, or a combination thereof. In some embodiments, the communication component 1516 receives a broadcast signal or broadcast associated information from an external broadcast management system via a broadcast channel. In some embodiments, the communication component 1516 further includes a near field communication (NFC) module to facilitate short-range communications. For example, the NFC module can be implemented based on radio frequency identification (RFID) technology, infrared data association (IrDA) technology, ultra wideband (UWB) technology, Bluetooth (BT) technology, and other technologies.

In some embodiments, the electronic device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 1504 including the instructions, and the above instructions may be exected by the processor 1520 of the electronic device 1520, for performing the above-described methods. For example, the non-transitory computer-readable storage medium may be a ROM, a random access memory (RAM), a CD-ROM, a magnetic tape, a floppy disc, an optical data storage device, and the like.

A non-transitory computer-readable storage medium that enables the electronic device to execute a control method when instructions in the storage medium are executed by the processor of the electronic device, the method including any of the above control methods.

Other implementations of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. The specification and embodiments are considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A control method, comprising:
    receiving a key press event sent by a stylus, wherein the stylus comprises a first physical key, a second physical key and a third physical key;
    determining a press type according to the key press event related to the first physical key;
    determining a control operation corresponding to the press type; and
    performing the control operation,
    wherein different press types correspond to different control operations,
    wherein determining the control operation corresponding to the press type comprises:
    determining the control operation corresponding to the press type according to an application type, a running state of a function of a current interface of a foreground application, and the press type,
    wherein in a case that the application type of the foreground application is different, a same press type corresponds to a different control operation,
    wherein the second physical key is configured for a screenshot function and the third physical key is configured for a shorthand function,
    wherein in a case that the press type is a first type, the control operation corresponding to the first type comprises performing a drawing operation on a display interface,
    wherein the control method further comprises: receiving a mouse movement event sent by the stylus, and
    wherein performing the drawing operation on the display interface comprises:
    performing the drawing operation on the display interface according to product information of the stylus and the mouse movement event.

2. The control method according to claim 1, wherein in a case that the function of the current interface of the foreground application is different, a same press type corresponds to a different control operation.

3. The control method according to claim 1,
    wherein performing the drawing operation on the display interface comprises: performing the drawing operation on the display interface in a current drawing mode or a default drawing mode,
    wherein the current drawing mode is a switched drawing mode; or
    the current drawing mode is an initial drawing mode that has not been switched.

4. The control method according to claim 1, wherein performing the drawing operation on the display interface according to the product information of the stylus and the mouse movement event comprises:
    determining that the stylus has a virtual laser function according to the product information of the stylus;
    modifying an event type of the mouse movement event from a mouse cursor type to a virtual laser type; and
    performing the drawing operation on the display interface according to the mouse movement event.

5. The control method according to claim 4, wherein performing the drawing operation on the display interface according to the mouse movement event comprises:
    obtaining positional movement information in the mouse movement event;
    invoking a laser cursor processing logic corresponding to the virtual laser type; and
    performing the drawing operation on the display interface according to the positional movement information through the laser cursor processing logic,
    wherein performing the drawing operation on the display interface according to the positional movement information comprises:
    invoking a laser view in a drawing window, and performing drawing by using the laser view according to the positional movement information,
    wherein the laser view supports drawing a cursor position or a cursor trajectory.

6. The control method according to claim 1, wherein in a case that the press type is a second type, the control operation corresponding to the second type is: switching a drawing mode,
    wherein the drawing mode is a first mode or a second mode, wherein the first mode is a mode for drawing a cursor position, and the second mode is a mode for drawing a cursor trajectory.

7. The control method according to claim 1, wherein in a case that the press type is a third type and a current drawing mode is a second mode, the control operation corresponding to the third type is: clearing a drawing trace in the second mode, wherein the second mode is a mode for drawing a cursor trajectory.

8. The control method according to claim 1, wherein in a case that the application type of the foreground application is a shooting type, and the function of the current interface of the foreground application is a photo-taking function, the control operation is: a single shot or a continuous shot.

9. The control method according to claim 8, wherein
in a case that the press type is a fourth type, the control operation corresponding to the fourth type is the single shot; or
in a case that the press type is a fifth type, the control operation corresponding to the fifth type is the continuous shot,
wherein the fourth type and the fifth type are different.

10. The control method according to claim 1, wherein in a case that the application type of the foreground application is a shooting type, and the function of the current interface of the foreground application is a video recording function,
in response to determining that the running state of the function of the current interface is that video recording has not been started, and the press type is a sixth type, the control operation is starting the video recording; or
in response to determining that the running state of the function of the current interface is that the video recording has been started, and the press type is a seventh type, the control operation is stopping the video recording;
wherein the sixth type and the seventh type are the same or different.

11. A stylus comprising: a pen body, and a first physical key, a second physical key, a third physical key, one or more power sources, a processor and a wireless transmitter in the pen body, wherein the one or more power sources is configured to supply power to the processor and the transmitter,
wherein the first physical key is configured to receive a press input operation;
the processor is configured to generate a key press event according to the press input operation; and
the wireless transmitter is configured to send the key press event,
wherein the key press event is used for determining a press type, and a control operation corresponding to the press type is determined according to an application type, a running state of a function of a current interface of a foreground application, and the press type, wherein in a case that the application type of the foreground application is different, a same press type corresponds to a different control operation,
wherein the second physical key is configured for a screenshot function and the third physical key is configured for a shorthand function,
wherein in a case that the press type is a first type, the control operation corresponding to the first type comprises performing a drawing operation on a display interface, and wherein the stylus further comprises: a displacement sensor electrically connected to the processor, wherein the displacement sensor is configured to collect displacement sensing data, the processor is configured to generate a mouse movement event according to the displacement sensing data; and the wireless transmitter is configured to send the mouse movement event, and
wherein performing the drawing operation on the display interface comprises: performing the drawing operation on the display interface according to product information of the stylus and the mouse movement event.

12. A control method for using a stylus, wherein the stylus comprises a pen body, and a first physical key, a second physical key, a third physical key, one or more power sources, a processor and a wireless transmitter in the pen body, wherein the one or more power sources is configured to supply power to the processor and the transmitter,
wherein the first physical key is configured to receive a press input operation;
the processor is configured to generate a key press event according to the press input operation; and
the wireless transmitter is configured to send the key press event,
wherein the control method for using the stylus comprises:
receiving the press input operation against the first physical key;
generating the key press event according to the press input operation;
sending the key press event,
wherein the key press event is used for determining a press type, and a control operation corresponding to the press type is determined according to an application type, a running state of a function of a current interface of a foreground application, and the press type, wherein in a case that the application type of the foreground application is different, a same press type corresponds to a different control operation,
wherein the second physical key is configured for a screenshot function and the third physical key is configured for a shorthand function,
wherein in a case that the press type is a first type, the control operation corresponding to the first type comprises performing a drawing operation on a display interface, and the method further comprises:
collecting displacement sensing data;
generating a mouse movement event according to the displacement sensing data; and
sending the mouse movement event,
wherein performing the drawing operation on the display interface comprises: performing the drawing operation on the display interface according to product information of the stylus and the mouse movement event.

13. An electronic device, comprising:
a processor; and
a memory for storing instructions executable by the processor,
wherein the processor is configured to perform the method according to claim 1.

14. An electronic device, comprising:
a processor; and
a memory for storing instructions executable by the processor,
wherein the processor is configured to perform the method according to claim 12.

* * * * *